United States Patent
Liisberg et al.

(10) Patent No.: US 10,089,195 B2
(45) Date of Patent: Oct. 2, 2018

(54) METHOD FOR REDUNDANT PROCESSING OF DATA

(71) Applicant: Robert Bosch GmbH, Stuttgart (DE)

(72) Inventors: Mikkel Liisberg, Stuttgart (DE); Roland Schleser, Abstatt (DE)

(73) Assignee: ROBERT BOSCH GMBH, Stuttgart (DE)

( * ) Notice: Subject to any disclaimer, the term of this patent is extended or adjusted under 35 U.S.C. 154(b) by 140 days.

(21) Appl. No.: 15/279,585

(22) Filed: Sep. 29, 2016

(65) Prior Publication Data

US 2017/0091051 A1 Mar. 30, 2017

(30) Foreign Application Priority Data

Sep. 30, 2015 (DE) .................. 10 2015 218 898

(51) Int. Cl.
*G06F 11/16* (2006.01)
*G06F 11/18* (2006.01)

(52) U.S. Cl.
CPC ........ *G06F 11/1658* (2013.01); *G06F 11/184* (2013.01); *G06F 11/181* (2013.01); *G06F 2201/805* (2013.01)

(58) Field of Classification Search
CPC ............ G06F 11/1637; G06F 11/1658; G06F 11/1675; G06F 11/1679; G06F 11/182–11/184; G06F 11/2097
USPC ..................................... 714/10–12
See application file for complete search history.

(56) References Cited

U.S. PATENT DOCUMENTS

| | | | | |
|---|---|---|---|---|
| 5,812,757 A | * | 9/1998 | Okamoto ............ | G06F 11/1658 714/11 |
| 5,903,717 A | * | 5/1999 | Wardrop ............. | G06F 11/1658 714/12 |
| 6,275,752 B1 | * | 8/2001 | Giers .................. | F02D 41/266 701/33.7 |
| 6,687,851 B1 | * | 2/2004 | Somers ............... | G06F 11/1641 714/11 |
| 6,940,811 B2 | * | 9/2005 | McDermott .......... | G06F 11/182 370/229 |
| 7,415,630 B2 | * | 8/2008 | Hillman .............. | G06F 11/1658 714/11 |
| 7,483,778 B2 | * | 1/2009 | Armbruster .............. | G05B 9/03 701/31.4 |
| 7,747,932 B2 | * | 6/2010 | Racunas ............. | G06F 11/1641 714/12 |

(Continued)

FOREIGN PATENT DOCUMENTS

| DE | 103322700 A1 | 9/2013 | | |
|---|---|---|---|---|
| GB | 2265737 A | * | 10/1993 | .......... G06F 11/1497 |
| WO | WO-2015086488 A1 | * | 6/2015 | .......... G06F 11/1484 |

OTHER PUBLICATIONS

Humphry, J.A. and Smith, S.E.; "A Fault-Tolerant/Fail-Safe Command and Control System for Automated Vehicles;" InVehicular Technology Conference, 1982. 32nd IEEE May 23, 1982 (vol. 32, pp. 420-426). IEEE.*

*Primary Examiner* — Joseph R Kudirka
(74) *Attorney, Agent, or Firm* — Norton Rose Fulbright US LLP; Gerard Messina

(57) ABSTRACT

A method for redundant processing of data by at least two processing units is described. After a restart or reset, the first processing unit of the at least two processing units receives first portions of the data for processing from at least one second processing unit of the at least two processing units.

20 Claims, 2 Drawing Sheets

(56) References Cited

U.S. PATENT DOCUMENTS

| | | | | |
|---|---|---|---|---|
| 2005/0240806 A1* | 10/2005 | Bruckert | ............... | G06F 9/52 |
| | | | | 714/6.11 |
| 2007/0220369 A1* | 9/2007 | Fayad | ............... | G06F 11/1004 |
| | | | | 714/48 |
| 2017/0139411 A1* | 5/2017 | Hartung | ............... | H04L 12/40 |

* cited by examiner

METHOD FOR REDUNDANT PROCESSING OF DATA

CROSS REFERENCE

The present application claims the benefit under 35 U.S.C. § 119 of German Patent Application No. DE 102015218898.1 filed on Sep. 30, 2015, which is expressly incorporated herein by reference in its entirety.

BACKGROUND INFORMATION

In safety-relevant systems, in which, for example, standard Ethernet components, processing units (multicore, many-core, µC, µP) and standard operating systems (for example, QNX or Linux) are used, it is often impossible to protect the entire system using self-tests. In many safety-relevant applications, for example, in functions for highly automated driving, calculations are carried out redundantly, for example, in so-called lockstep methods. Such lockstep calculations may also be implemented, for example, as pure software locksteps without hardware support. In systems where demands for safety, availability, and performance of the systems are particularly high, the safety functions may be calculated in a distributed manner, i.e., on different separate hardware units.

German Patent Application No. DE 103322700 A1 describes a processor unit including two execution units, which run the same program, and comparison means, which check whether the states of the execution units arising while they run the same programs are identical.

SUMMARY

The present invention relates to methods for redundant processing of data and to processing units configured for carrying out one of the methods. Furthermore, the present invention relates to a computer program designed for carrying out one of the methods.

It is provided that, in a system having multiple processing units, which receive the same input data and process them in the same way, i.e., carry out redundant processing of data, one of the processing units, after a restart or reset, receives a portion of the data for processing from one or multiple of the other redundantly operating processing units. Such a system is thus capable of independently replicating data lost or missed due to a restart (for example, triggered by an error), which, however, may be needed for processing. In this way, in such a distributed system having multiple processing units the availability of the system is largely preserved in the event of failure of one or multiple processing units, complete system failure by restart of the entire system is avoided, and a state of limited functionality is kept preferably short. This is important, in particular, in the case of time-critical or safety-critical applications such as, for example, highly automated driving, since such a system cannot transition for safety reasons to a non-operable state in the event of an error; in the example of highly automated driving, for example, the controls cannot be directly transferred to the driver in the event of an error.

One embodiment, in which the processing unit, which is restarted or reset, independently requests the needed data from one or multiple of the other processing units, is implemented in a particularly simple manner with quick responses.

In one preferred embodiment, the system goes into a protected state due to the omission of a redundantly calculating processing unit. In this state, the functionality of the system is preferably limited. The system may go again into the normal state of full functionality when the full redundancy of calculation is ensured or, in an even safer variant, when the full redundancy of calculation is restored and the data replicated by the other processing units are no longer used for processing. A particularly safe overall system is thus implemented, which may even tolerate the temporary omission of a processor component.

Data replication may be configured to be particularly safe in that the restarted or reset processing unit receives the needed data not only from one other processing unit, but from multiple other processing units. The data thus received may be checked for consistency, and further processing of the data may be made dependent on the consistency. Mutual dependencies of the calculations between the processing units may thus be avoided. For example, the propagation of a single data error is thus almost impossible. Namely, if there is a data error in the requested data in one of the other processing units, the restarted or reset processing unit would detect this at the time of the comparison with the received data of one or multiple of the other processing units.

In an alternative embodiment, the other processing units may also transmit only a portion of the needed data to the restarted or reset processing unit. This results in a lower data transfer load and may possibly at least reduce the dependencies among the individual processing units.

In order to preserve the safety of the overall system and avoid errors in the data transfer, the data transfers should preferably be protected using check sums, live counters, or otherwise.

In one preferred embodiment, the results of the redundant calculations are supplied by the processing units to a comparison unit, which checks the results for consistency and may initiate error responses in the event of non-consistency.

BRIEF DESCRIPTION OF THE DRAWINGS

The present invention is described in greater detail below with reference to the figures, using exemplary embodiments.

DETAILED DESCRIPTION OF EXAMPLE EMBODIMENTS

Figure 1:
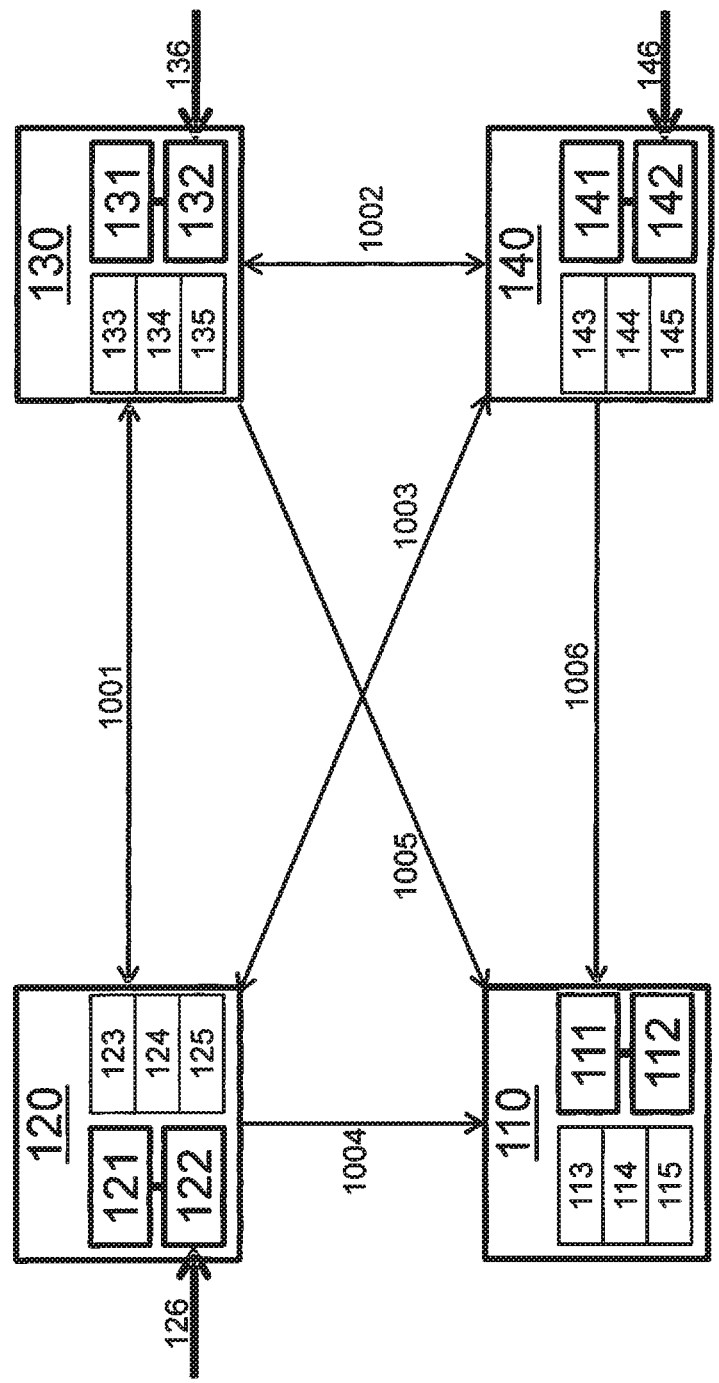
FIG. 1 schematically shows an exemplary system including processing units and a comparison unit.

FIG. 1 shows an exemplary system for redundant calculation of data. The system includes a first processing unit 120, a second processing unit 130, and a third processing unit 140. Processing units 120, 130, 140 are preferably separate hardware units, i.e., in particular not different cores of a processor. Processing units 120, 130, and 140 have computing means 121, 131, and 141, and memories 122, 132, and 142. In memories 122, 132, and 142 data may be stored, which are processed in computing means 121, 131, and 141. Data processing of processing units 120, 130, and 140 is preferably used for safety-relevant functions of the system. The data to be processed are received by processing units 120, 130, and 140 for example, via communication links 126, 136, and 146. In the preferred exemplary embodiment, processing units 120, 130, and 140 receive identical data via communication links 126, 136, and 146 and carry out a mutually redundant (i.e., the same) processing of these identical data.

The system also includes a comparison unit 110, which receives, via communication links 1004, 1005, and 1006 the results of the redundant processing of data by processing units 120, 130 and 140. In a preferred embodiment, processing units 120, 130, and 140 are designed as microprocessors, and comparison unit 110 is designed as a microcontroller.

In addition, processing unit 120 includes memories 123, 124, and 125, processing unit 130 includes memories 133, 134, and 135, and processing unit 140 includes memories 143, 144, and 145, in which service data, such as information about the other units present in the system in particular, may be stored. Service data about the other units present in the system (in particular processing units 120, 130, 140) may also be stored in memories 113, 114, 115 of comparison unit 110.

In addition, processing units 120, 130, and 140 are connected to each other via communication links 1001, 1002, and 1003.

The illustrations of the communication links in FIG. 1 are to be understood as schematic. The communication may take place, for example, via point-to-point connections, but also via one or multiple shared bus(es). For example, standard Ethernet communication links may be used in the system.

When the system illustrated is started, for example, by turning on a voltage supply, the processing units are started up and send service offers, preferably identifiable via message IDs, for lockstep calculations for each multicast communication. The service data of a processing unit are stored by the other processing units, for example, for the service data of processing units 130 and 140, by processing unit 120 in their memories 123 and 124. Processing units 120, 130, and 140 now need, for the lockstep functionality provided, another comparator service and send an appropriate request message. Comparison unit 110 responds to it via the offer that it is able to provide the comparator functionality. This piece of information is also stored in processing units 120, 130, 140, for example, in memory 125 of processing unit 120. Alternatively, all units (i.e., processing units 120, 130, 140 and comparison unit 110) may also directly inform all other units of their services after system start.

Processing units 120, 130, 140 now form a network for receiving synchronized data frames as a basis for redundant data processing. Together with comparison unit 110, processing units 120, 130, 140 form a network for adjusting redundant lockstep calculations or redundant data processing.

Comparison unit 110 may, on the one hand, evaluate on the basis of the comparison of the processing results obtained from processing units 120, 130, 140 whether the results of the data processing are reliable, for example, if all redundantly calculating processing units deliver the same result or when, alternatively, a required minimum number m of n redundantly calculating processing units deliver the same result. On the other hand, comparison unit 110 may also have further functionalities and, for example, it may also carry out (safety-critical) functions as processing results verified as reliable, or initiate error responses in the event of insufficient consistency of the comparison results.

Figure 2:
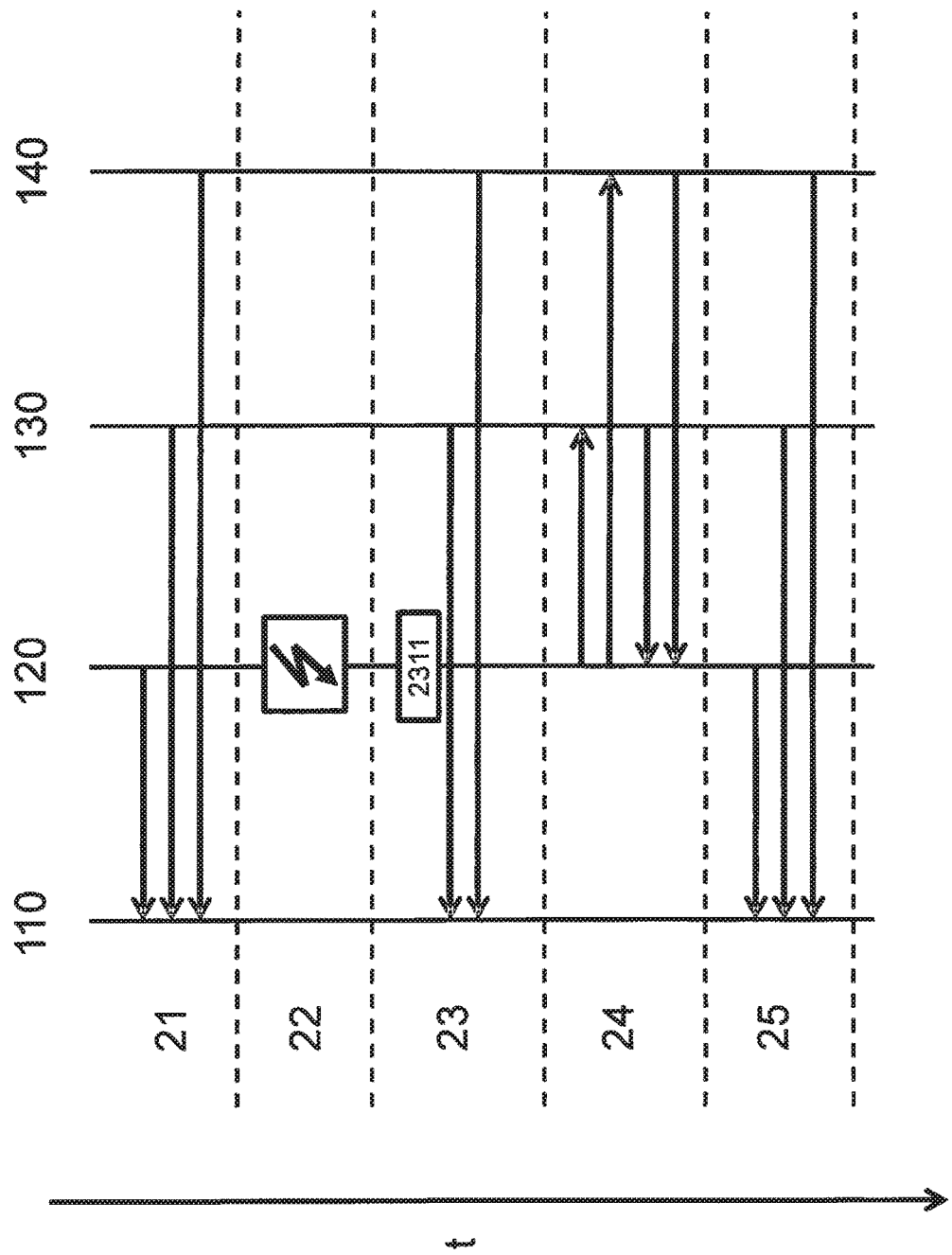
FIG. 2 schematically shows an exemplary method for redundant calculation of data.

FIG. 2 shows a method for redundant processing of data. In a first step 21, comparison unit 110 receives the results of the redundant data processing of processing units 120, 130, and 140. As described above, this data processing is preferably based on identical, synchronized data received by processing units 120, 130, and 140.

In step 22, an error occurs in processing unit 120. This may be a computation error, a program error or a processing error, which is detected by internal monitoring of processing unit 120 or by external monitoring of processing unit 120 (for example, by comparison unit 110). Processing unit 120 then restarts by itself or is restarted externally (for example, by a watchdog shutdown or shutdown by comparison unit 110). During the restart, processing unit 120 is not available for the redundantly operating system.

The redundant data processing in the lockstep network is thus reduced in step 23 to the remaining processing units 130 and 140, while processing unit 120 is being restarted (box 2311 in FIG. 2). Accordingly, comparison unit 110 compares the redundant processing results of processing units 130 and 140. In an alternative exemplary embodiment, in which only two processing units are provided for redundant processing of data from the beginning, in the event of failure of one of the processing units, comparison unit 110 has only one processing result available for use as the basis of the desired functions; i.e., a comparison may no longer take place.

Due to the failure of one processing unit (here processing unit 120), the safety of the redundantly calculating network is thus reduced. Therefore, for this case it is preferably provided that the system goes into a protected mode (fail operational state). This may be characterized, for example, by a reduced functionality. In the event of failure of multiple processing units or, for example, if the functions to be calculating do not accept data processing by a single processing unit and thus without comparison, the system, preferably via comparison unit 110, may also be brought into a safe state in which no communication to the outside is possible (fail silent state).

In addition, such a reset of a processing unit is usually associated with data losses. In a restart, processing unit 120 may thus lose data, which are used as a basis for the processing of data, from memory 122 and service data about the other units from memories 123, 124, 125. Incoming data may also be missed by processing unit 120 during the restart.

In order to bring the system to its full range of functions without a complete system restart, the restart of processing unit 120 preferably triggers renewed service requests of processing unit 120 as described above for the system start. Processing unit 120 then receives information about the other units again and stores it in memories 123, 124, 125.

In the meantime, as described above, the data needed for processing may get lost from memory 122 due to the restart of processing unit 120, or processing unit 120 may miss the data needed for processing during the restart. This is critical in particular, if not only the presently received data, but also the previously received data must be used for the present data processing by processing units 120, 130, 140.

In order to make a preferably quick system recovery possible, processing unit 120 makes a data replication request to one or, as shown in step 24 of FIG. 2, to both of the other processing units 130 and 140. This request may refer to certain specific data and may include all data previously received by processing units 120, 130, 140; in particular, the data missed during the restart of processing unit 120 may also be requested. Processing unit 120 then receives the desired data from the other processing units 130 and 140.

In one alternative embodiment, restarted processing unit 120 receives the necessary data from the other processing units even without a specific request, for example, since the other processing units 130, 140 or the comparison unit 110 recognize that a fail operational state exists or that these data are needed by processing unit 120.

After the data replication, the system again has (largely) the original safety. The protected system state including reduced functionality may thus be terminated. Alternatively, the protected system state may be preserved as long as the data processing is still dependent on the replicated data due to failed processing unit 120, since this may still reduce the safety of the system. This is the case, in particular, when the requested data are replicated from a single source (from another processing unit).

Different alternatives may be meaningful for data replication. In a simple first embodiment, the restarted processing unit may receive the requested data from one of the other processing units and store them. In a second preferred embodiment, the restarted processing unit requests data from multiple other processing units, and receives from them always the same requested data, which it compares to each other. If the data are identical (or, in the case of more than two other processing units, if a fixed number of data sets are identical), these are accepted by the restarted processing unit and used for its further data processing. In a third specific embodiment, the restarted processing unit receives only portions of the requested data from multiple other processing units and then assembles them. The coordination of which processing unit sends which portion of the data may be either preconfigured or assumed by one of the processing units or by the comparison unit.

The data to be replicated are preferably transmitted from the other processing unit(s) protected, for example, via check sums such a CRC or hash values or via live counters.

One preferred application of the above-described method for redundant data processing may be used in the field of surroundings detection, for example, in highly automated driving. In this case the processed data may originate from sensor measurements, for example, in the form of radar, Light Detection And Ranging (LiDAR) LIDAR, ultrasound measurements or video recordings. For calculating surroundings of the vehicle, not only the presently measured or received sensor data, but also the previously received sensor data must be used since these sensor data are usually based on each other. In the preferred exemplary embodiment, the redundantly computing processing units receive identical data from each sensor source and process them, for example, to calculate surroundings data. If one of these processing units is restarted, for example, due to a detected error, this processing unit may receive data needed by the other processing units but not available due to the restart. In the meantime, however, further surroundings information is needed for the highly automated driving. The unaffected processing units therefore continue to process data. Due to the reduced redundancy and the therefore reduced safety of the system, the latter is, however, put into a protected state, for example, by reducing the driving speed, by outputting a warning message, or by safely stopping the vehicle. After successful data replication or, alternatively, as soon as the replicated data are no longer needed, the system may return to the fully functional state.

What is claimed is:

1. A method for redundant processing of data by at least two processing units, the method comprising:
   receiving, by the at least two processing units, data, the data received by the at least two processing units being identical;
   redundantly processing the received data by the at least two processing units;
   detecting an error in a first processing unit of the at least two processing units based on the redundant processing;
   based on detecting the error, restarting or resetting the first processing unit;
   after the restarting or resetting of the first processing unit, receiving and processing, by the first processing unit, additional data transmitted from at least one second processing unit of the at least two processing units, the additional data including data received by the first processing unit prior to the restarting or resetting of the first processing unit, and data missed by the first processing unit during the restarting or resetting of the first processing unit; and
   after the receiving and processing of the additional data by the first processing unit, the at least two processing units resuming redundant data processing.

2. The method as recited in claim 1, wherein, after the restart or reset, requesting, by the first processing unit, the additional data from the at least one second processing unit.

3. The method as recited in claim 1, further comprising:
   putting a system including the at least two processing units into a protected system state by the restart or reset of the first processing unit, the protected state having reduced functionality.

4. The method as recited in claim 3, wherein the protected system state is terminated when the first processing unit has resumed data processing or when the first processing unit no longer needs the additional data for processing.

5. The method as recited in claim 1, wherein the first processing unit receives the additional data at least from a particular second processing unit of the at least two processing units and from a third processing unit of the at least two processing units.

6. The method as recited in claim 5, further comprising:
   comparing, by the first processing unit, the additional data received from the particular second processing unit to the additional data received from the third processing unit, to determine if the additional data received from the second particular processing unit are identical to the additional data received from the third processing unit; and
   based on results of the comparing, the first processing unit processing the additional data.

7. The method as recited in claim 1, wherein the first processing unit receives first portions of the additional data from a particular second processing unit of the at least two processing units, the first processing unit receives second portions of the additional data from a third processing unit of the at least two processing units, and the first processing unit assembles data needed for processing from the first portions of the additional data and the second portions of the additional data.

8. The method as recited in claim 1, wherein the additional data sent from the at least one second processing unit and received by the first processing unit are protected prior to being sent by the at least one second processing unit via one of a check sum or live counter information.

9. The method as recited in claim 1, wherein first results of a processing of data by the first processing unit and at least second results of a processing of data by the at least one second processing unit are checked by a comparison unit for consistency.

10. The method as recited in claim 9, wherein the first processing unit and the at least one second processing unit are microprocessors, and the comparison unit is a microcontroller.

11. The method as recited in claim 1, wherein the first processing unit detects the error itself.

12. The method as recited in claim 1, wherein the error is detected by an external monitoring of the first processing unit by a comparison unit.

13. The method as recited in claim 1, wherein the data received by the at least two processing units and redundantly processed by the at least two processing units are based on sensor measurements.

14. The method as recited in claim 13, wherein the redundant processing of the received data occurs within a surroundings detection in an application for highly automated driving, and the sensor measurements include at least one of radar measurements, Light Detection and Ranging ("LIDAR") measurements, video recordings, and ultrasound measurements.

15. The method as recited in claim 1, wherein in the event of a start of a system including the at least two processing units and one comparison unit, the at least two processing units and the comparison unit exchange information about services offered in the system.

16. The method as recited in claim 15, wherein after the restart of the first processing unit, the first processing unit receives information about services offered by another of the at least two processing units and about services offered by the comparison unit.

17. A non-transitory electronic memory medium on which is stored a computer program for redundant processing of data by at least two processing units, the computer program, when executed by a processor, causing the processor to:
receive, by the at least two processing units, data, the data received by the at least two processing units being identical;
redundantly process the received data by the at least two processing units;
detect an error in a first processing unit of the at least two processing units based on the redundant processing;
based on detecting the error, restart or reset the first processing unit;
after the restart or reset of the first processing unit, receive and process, by the first processing unit, additional data transmitted from at least one second processing unit of the at least two processing units, the additional data including data received by the first processing unit prior to the restarting or resetting of the first processing unit, and data missed by the first processing unit during the restart or reset of the first processing unit; and
after the receiving and processing of the additional data by the first processing unit, the at least two processing units resume redundant data processing.

18. A first processing unit of at least two processing units for redundant processing of data by the at least two processing units, the first processing unit configured to:
receive data, the data received by the first processing unit being identical to data received by at least a second one of the at least two processing units;
redundantly process the received data, the processing being redundant relative to processing by others of the at least two processing units;
detect an error in the first processing unit based on the redundant processing;
based on detecting the error, restart or reset the first processing unit;
receive, after the restart or the reset of the first processing unit, additional data transmitted from at least one second processing unit of the at least two processing units, the additional data including data received by the first processing unit prior to the restart or reset of the first processing unit, and data missed by the first processing unit during the restart or reset of the first processing unit; and
after the receipt and processing of the additional data by the first processing unit, the first processing unit resuming redundant data processing.

19. A method for redundant processing of data by at least two processing units in a vehicle, the method comprising:
receiving, by the at least two processing units, sensor data from at least one sensor of the vehicle, the sensor data received by the at least two processing units being identical, the sensor data being sensor measurements including at least one of radar measurements, Light Detection and Ranging (LIDAR) measurements, video recordings, and ultrasound measurements;
redundantly processing the received sensor data by the at least two processing units for surroundings detection in an application for highly automated driving of the vehicle;
detecting an error in a first processing unit of the at least two processing units based on the redundant processing;
based on detecting the error: (i) restarting or resetting the first one of the processing units, and (ii) putting the vehicle in a protected system state including at least one of reducing a driving speed of the vehicle, outputting a warning message, and stopping the vehicle;
receiving, by the first processing unit, first portions of the sensor data for processing transmitted from at least one second processing unit of the at least two processing units, the receiving being after the restarting or the resetting of the first processing unit; and
after the receiving by the first processing unit, returning the vehicle to a fully functional state.

20. The method as recited in claim 19, wherein the first portions of the sensor data include data received by the first processing unit prior to the restarting or resetting of the first processing unit, and data missed by the first processing unit during the restarting or resetting of the first processing unit.

* * * * *